United States Patent
Orava et al.

(10) Patent No.: US 6,268,605 B1
(45) Date of Patent: Jul. 31, 2001

(54) AUTORADIOGRAPHY IMAGING

(75) Inventors: Risto O. Orava, Helsinki; Jouni I. Pyyhtiä, Vantaa; Tom G. Schulman, Masala, all of (FI); Miltiadis E. Sarakinos, Geneva (CH); Konstantinos E. Spartiotis, Espoo (FI)

(73) Assignee: Simage Oy, Espoo (FI)

( * ) Notice: Subject to any disclaimer, the term of this patent is extended or adjusted under 35 U.S.C. 154(b) by 0 days.

(21) Appl. No.: 09/142,772
(22) PCT Filed: Mar. 10, 1997
(86) PCT No.: PCT/EP97/01200
§ 371 Date: Feb. 26, 1999
§ 102(e) Date: Feb. 26, 1999
(87) PCT Pub. No.: WO97/34164
PCT Pub. Date: Sep. 18, 1997

(30) Foreign Application Priority Data

Mar. 14, 1996 (GB) .................................................. 9605382

(51) Int. Cl.[7] .................................................. H01L 27/14
(52) U.S. Cl. .................................. 250/370.01; 250/370.11
(58) Field of Search .......................... 250/370.01, 370.11, 250/282, 484.4, 583

(56) References Cited

U.S. PATENT DOCUMENTS 5,315,507 * 5/1994 Nakajima et al. .................... 250/583
5,347,139 * 9/1994 Barker et al. ........................ 250/583
5,828,067 * 10/1998 Rushbrook et al. ............ 250/370.11

FOREIGN PATENT DOCUMENTS 0 220 732   5/1987   (EP) .
2 289 983  12/1995   (GB) .

OTHER PUBLICATIONS

WPI Abstract Accession No. 88–295261/42 & JP 630096588 A (Fuji), Apr. 27, 1988.
Internationl Journal of Applied Radiation and Isotopes, vol. 35, No. 2, 1984, Oxford, GB, pp. 129–134, D'Argy, R. et al.: *Whole–Body Autoradiography Using 11c with Double Tracer Application*.
NTIS Tech Notes, No. 5, Part E, May 1986, USA, pp. 495/01, 2 XP000004879 Image Enhancement for Neurobiologists Available.
Nuclear Instruments & Methods in Physics Research, Section A: Accelerators, Spectrometers, Detectors and Associated Equipment, vol. A288, No. 1, Mar. 1, 1990, pp. 250–253, XP000100349, Schooneveld E. M. et al.: *A Silicon Strip Detector for Radiochromatography*.
IEEE Transactions on Nuclear Science, vol. NS–32, No. 1, Feb. 1985, pp. 567–570, XP002023971, Bonazzola G C et al.: *Charge Coupled Devices as Autoradiography Imagers*.

* cited by examiner

Primary Examiner—Constantine Hannaher
Assistant Examiner—Otilia Gabor

(57) ABSTRACT

A method of autoradiography imaging includes steps of: (a) forming a subject having at least first and second markers, each marker providing radiation having a characteristic energy distribution; (b) detecting radiation from the marked subject using a semiconductor radiation detector having an array of cells, each cell recording a charge value dependent on the energy of incident radiation; (c) processing the output from the cells including discriminating charge values within at least two charge value ranges and allocating a display color value to each pixel cell position in the array dependent upon the recorded charge value; and (d) forming an image for display with individual cell positions having a color representative of the color values. The method enables multiple label or multiple marker imaging in autoradiography to be performed by energy discriminating imaging, thus enhancing experimental accuracy and reproducibility.

36 Claims, 4 Drawing Sheets

AUTORADIOGRAPHY IMAGING

BACKGROUND OF THE INVENTION

The present invention relates to a method and apparatus for autoradiography imaging.

Autoradiography is a technique which is widely used for imaging in various different application. Typically, imaging is performed by detecting beta rays using isotopes such as 3H, 35S, 32P, 33P and 14C and 125I (for X-rays). These isotopes are used as labels or markers for marking a subject to be imaged. Examples of subjects to be imaged can be slices of tissue taken from a human or animal body which has been marked by the radioactive isotope, or by another radiation emitting marker, or, a blot formed as a part of DNA, RNA, etc., analysis.

Where the sample to be imaged is a slice of tissue from a human or animal body, this will typically result from the injection of the body with radioactive markers, the sample then being taken after the marker has been dispersed within the tissue to be examined.

Where the sample is a "blot", this can result from the conventional techniques such as "Western blotting", "Southern blotting", "Northern blotting", etc. The technique most widely used for separating DNA, RNA or protein molecules of useful size is electrophoresis on an agarose gel which separates the DNA, RNA or protein molecules into discrete bands dependent on their size. The position of the bands on the gel is shown by a fluorescent ethidium bromide dye, or by autoradiography. This technique is carried out by denaturing and transferring the fragments using the so-called Southern, Northern or Western blotting techniques onto a matrix which can be probed with a radioactive DNA, RNA, protein or carbohydrate "probe" (a molecule that attaches to a specific location on the fragment). After the unbounded probe is washed off, the amount and position of the DNA, RNA, protein carbohydrate fragments which hybridized with the probe can be detected by counting the radioactivity or by autoradiography.

DNA sequence analysis is based on high-resolution electrophoresis on denaturing (SDS) polyacrylamide gels. Samples of label fragments are treated under four different conditions with chemical reagents that cause cleavage in known positions along the molecules. The pattern of the tracks and the resulting four "lanes" of sequences are used to read the sequence. Western blotting techniques are generally similar to the Southern blotting of DNA and are applied to separating and analyzing proteins as in the screening of antisera and antigens and DNA or RNA binding proteins.

RNA can be characterized (that is its base sequence or protein amino acids sequence determined) by an adaptation of the Southern blotting transfer technique, for example by so-called "Northern blotting" where RNA is transferred from the gel to nitro-cellulose under high salt conditions. The fractionated RNA characterization is by hybridization to specific probes usually labelled with radioactive markers. The process involves running a sample and then running a reference under hopefully identical conditions.

Most widely used today in the above methods is detection by film. This is a non-digital imaging technique with the radiated beta rays being recorded on the film. The image resolution is better than 50 $\mu$m, with a sensitivity for the isotope 14 C. (this isotope is used here as a reference) less than 0.015% and a dynamic range of two orders of magnitude. There is no possibility for real time imaging, although after image accumulation, digitization is possible.

Digital imaging is offered by a digital imaging plate operating on a photoluminescence principle. In this, beta rays are accumulated on the digital imaging plate which is later on scanned with a laser to produce a digital image. Image resolution with this technique is about 100 $\mu$m, the sensitivity to 14 C. is less than 1% and the dynamic range is about four orders of magnitude. Real time imaging is not a possibility for this type of autoradiography imaging. The whole image is first digitally accumulated and then displayed after the laser scan.

A further digital imaging technique is provided by wire gas chambers. Image accumulation and display is in real time, but the image resolution is at best 300 $\mu$m. The sensitivity to 14 C. is 1.5% and the dynamic range is 5 to 6 orders of magnitude.

A yet further imaging technique has been brought to the Applicant's attention which helps put the present invention in context. Nuclear Instruments & Methods in Physics Research, Section A: Accelerators, Spectrometers, Detectors and Associated Equipment, Vol. A228, No. 1, Mar. 1, 1990, pages 250to 253, XP000100349, Schooneveld E M et al; "a Silicon Strip Detector for Radiochromatography" discloses an imaging technique utilising a silicon strip detector, sensitive to β-rays and a single radioactive isotope marker. The analogue signal output from the detector is digitised by way of threshold circuitry and R/S flip flops. The image resolution for this detector is given as being better than 500 $\mu$m.

None of the above methods and systems provide an optimal combination of performance characteristics for use in autoradiography. Moreover, the conventional methods of performing autoradiography suffer from reproducibility difficulties. In other words, if a comparison is to be made between various markers, the process needs to be repeated at different distinct times. This has the disadvantage that conditions may change between the tests, and there are opportunities for errors to occur.

SUMMARY OF THE INVENTION

The present invention seeks to address and to mitigate the above-mentioned problems.

In accordance with a first aspect of the invention, there is provided a method of autoradiography imaging comprising:

a) forming a subject (11) having a first marker for providing radiation having a characteristic energy distribution; and b) detecting radiation from said marked subject using a semiconductor radiation detector (20) characterised by:

c) forming the subject having at least a further second marker, wherein each marker provides radiation having a characteristic energy distribution;

d) detecting radiation from said marked subject using a semi conductor radiation detector having an array of cells, each cell of which records a charge value dependent on the energy of radiation incident thereon;

e) processing the output from said cells including discriminating charge values within at least two charge value ranges and allocating a display colour value to each cell position in said array dependent upon the recorded charge value; and f) forming an image for display with individual cell positions having a colour representative of said colour values.

Thus, the invention provides a technique for performing multiple label or multiple marker imaging in autoradiography based on an energy discriminating imaging technique and the use of two, or more, markers, each providing a respective distinct radiation energy distribution. By simultaneously performing imaging for different markers, enhanced accuracy and reproducibility of the results is possible.

The colour values can be respective grey scale values for a predetermined colour or each colour can be a respective, distinct colour.

Preferably, the markers comprise radioactive markers, for example radioactive isotopes chosen from the following list: 3H, 35S, 32P, 14C and 125I. Preferably also, the markers emit high energy radiation having an energy in excess of 1 keV. More preferably the markers emit beta-rays and each provides a different energy distribution.

The invention finds application to a method where step (a) comprises forming a subject in the form of a DNA, RNA or protein blot by using first and second probes, each of which has a different radioactive marker.

The invention also finds application to a method where the method comprises marking a tissue sample with at least two markers.

In one embodiment step (b) comprises detecting radiation from the marked subject using a semiconductor radiation detector having a one-dimensional array of strip cells.

In another embodiment step (b) comprises detecting radiation from the marked subject using a semiconductor radiation detector having first and second one-dimensional arrays of strips arranged orthogonally to one another to define a two-dimensional array of pixel cells.

Step (b) can also comprise detecting radiation from the marked subject using a semiconductor radiation detector having a two-dimensional array of pixel cells.

In accordance with another aspect of the invention, there is provided autoradiography apparatus for performing the method as defined above, comprising a semiconductor radiation detector having an array of cells for recording a charge value dependent on the energy of radiation incident thereon from a marked subject and processing means for processing the output from the cells, the processing means being arranged to discriminate charge values within at least two charge value ranges and to allocate a display colour value to each pixel cell position in the array dependent upon the recorded charge value for forming an image for display with individual cell positions having a colour representative of the colour values.

Embodiments of the invention will be described hereinafter with reference to the accompanying drawings in which:

DETAILED DESCRIPTION

Figure 1:
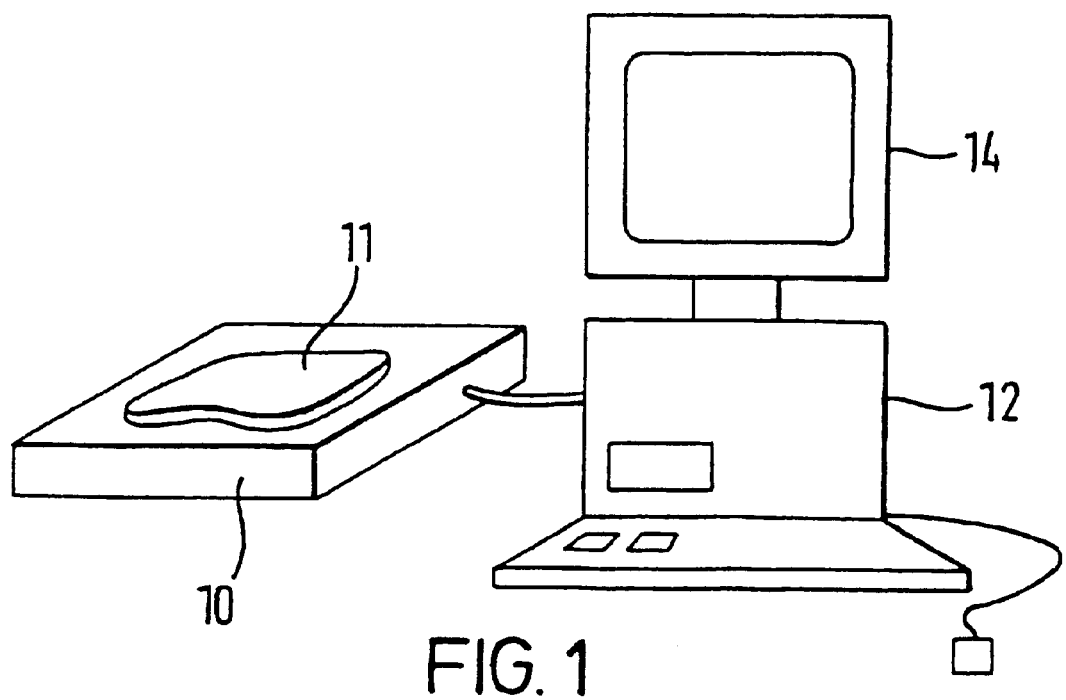
FIG. 1 is an overview of an example of an autoradiography imaging system in accordance with the present invention.

FIG. 1 is an overall schematic representation of an example of an autoradiography system in accordance with the present invention. The system of claim 1 includes an radiation detector system 10 on which a sample to be imaged 11 is clamped, an image processing system 12 and a display 14. The image processing system 12 can be implemented using a conventional personal computer suitably programmed to provide the necessary image processing. The personal computer 12 can be provided with a conventional hardware configuration including a processor, memory, background storage devices, keyboard and other input devices, input and output ports and a graphical user interface for interfacing with the display 14. The computer can be programmed suitably to interact with the display and the user input devices and to receive and process electrical signals from the detector system 10.

Figure 2:
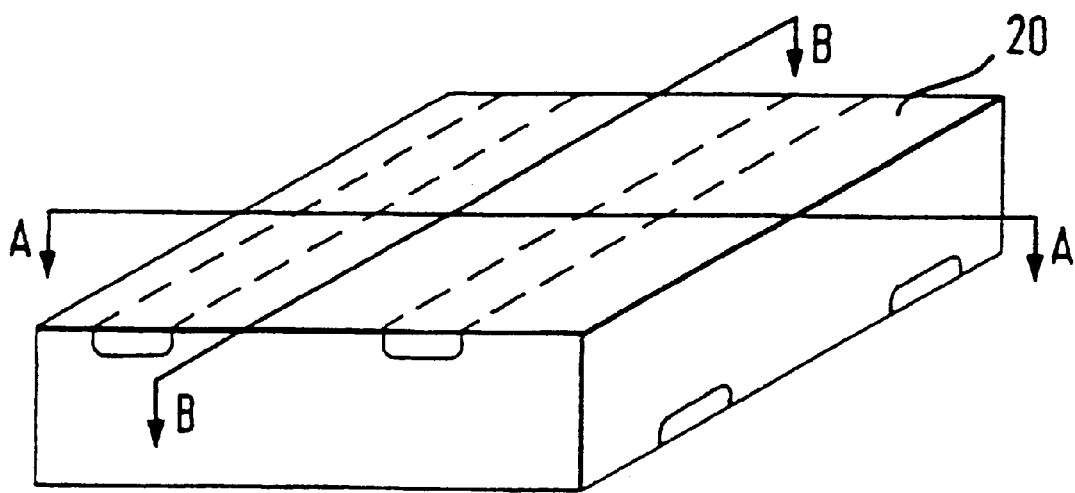
FIG. 2 is a schematic representation of one form of radiation detector for use in the imaging system of FIG. 1.
Figure 3:
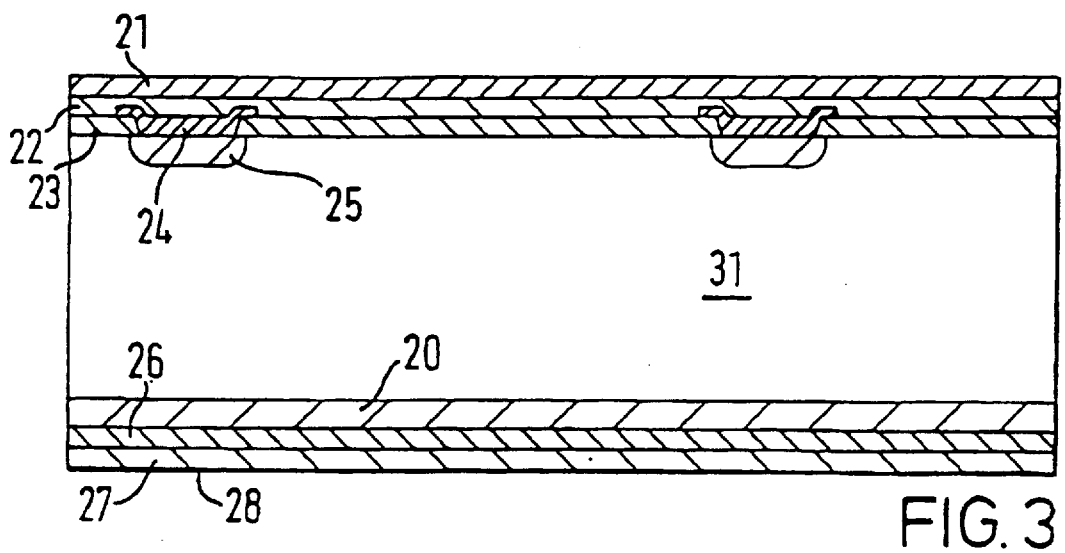
FIG. 3 is a schematic cross-section of the detector of FIG. 2.
Figure 4:
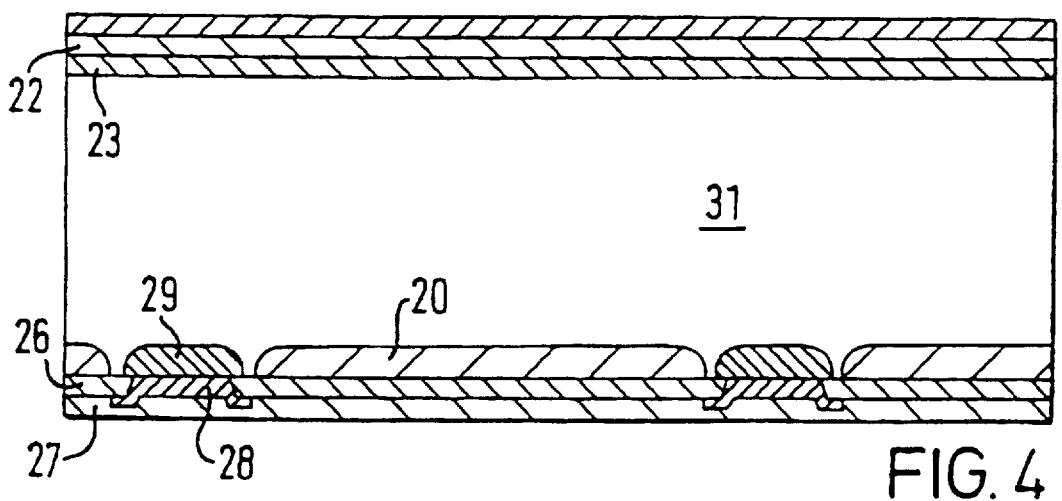
FIG. 4 is a second schematic cross-section of the detector of FIG. 2.

FIG. 2 is a schematic perspective representation of a double-sided silicon strip detector 20. A schematic cross-section along line A—A is shown in FIG. 3. A schematic cross-section along line B—B is shown in FIG. 4. The double-sided silicon strip detector will now be described with reference to FIGS. 2–4. It should be noted that FIGS. 2–4 are merely schematic. In practice, a silicon radiation detector includes a large number of parallel strips, rather than the two parallel strips in each direction illustrated in FIGS. 2–4. Also, FIGS. 2–4 do not show the edge details for providing connection to read-out circuits to be described later with reference to FIG. 6. The edge connections can be provided in a conventional manner.

The body of the silicon strip detector 20 forms a depletion layer 31 represented in FIGS. 3 and 4. Parallel P$^+$strips 25 are formed at the upper surface of the depletion layer 31. Each P$^+$strip 25 is covered with an aluminum strip 24 to achieve electrical contact for charge collection. A field oxide layer 23 extends between the aluminium strips 24. A passivation layer 22 of silicon dioxide ($SiO_2$) is formed over the aluminium strips 24 and the field oxide layer 23. The top surface of the detector 20 is provided with a thin MYLAR™ layer 21 to protect the underlying layers. In use the sample to be examined is clamped to the MYLAR™ layer 21 by a suitable clamping arrangement (not shown). The layers described above are best seen in FIG. 3 as the strips 25 run perpendicular to the plain of the cross-section.

At the lower side of the depletion layer 31, parallel N$^+$strip implantations 29 are provided, with corresponding aluminum strips 28 to provide good electrical connection. Electrical separation of the N$^+$strips 29 is achieved with a P$^+$layer 30. A field oxide layer 26 is provided between the aluminium strips 28. Also, a passivation layer 27 of $SiO_2$ is provided covering the aluminium strips 28 and the field oxide layer 26. The structure of the layers and strips below the depletion layer 31 is best seen in FIG. 4 as the cross-section on line B—B runs perpendicular to the line of the strips 29.

It will, accordingly, be appreciated that the strips 25 run perpendicular to the strips 29. Accordingly, with strips running in perpendicular directions, a two-dimensional detector grid can be provided. With the example of a double-sided silicon strip detector as shown in FIGS. 2–4, beta particles must penetrate through the layers 21, 22 and 23 in order to reach the depletion layer 31. The thickness of this entrance window (that is the combination of the layers 21, 22 and 23) can be as small as 1–2 $\mu$m. As mentioned above, as result of the perpendicularly running strips above and below the depletion layer 31, two-dimensional detection of the location of the incident ray can be detected. This is achieved by detecting the charge which is caused by the incident ray on the closest adjacent strips 25 and 29. The size of the charge created depends upon the energy of the incident ray.

Figure 5:
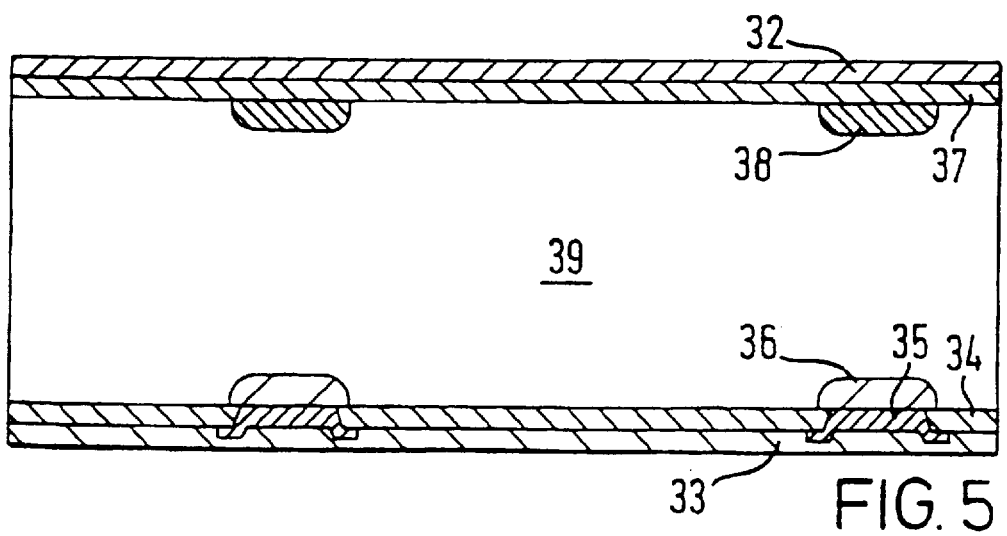
FIG. 5 is a schematic cross-section of a second type of detector.

FIG. 5 illustrates an alternative strip detector, this time a single-sided strip detector. As with FIGS. 2–4, FIG. 5 is merely schematic, and in practice the detector will include many parallel strips rather than the two shown in FIG. 5. A central depletion layer 39 and parallel P$^+$strips 36 are formed at the lower surface of the depletion layer 39. The P$^+$strips 36 have adjoining aluminum strips 35 to achieve electrical contact for charge collection. A field oxide layer 34 extends between the aluminium strips 35. A passivation layer 33 of silicon dioxide is formed over the aluminium strips 35 and the field oxide layer 34.

Figure 7:
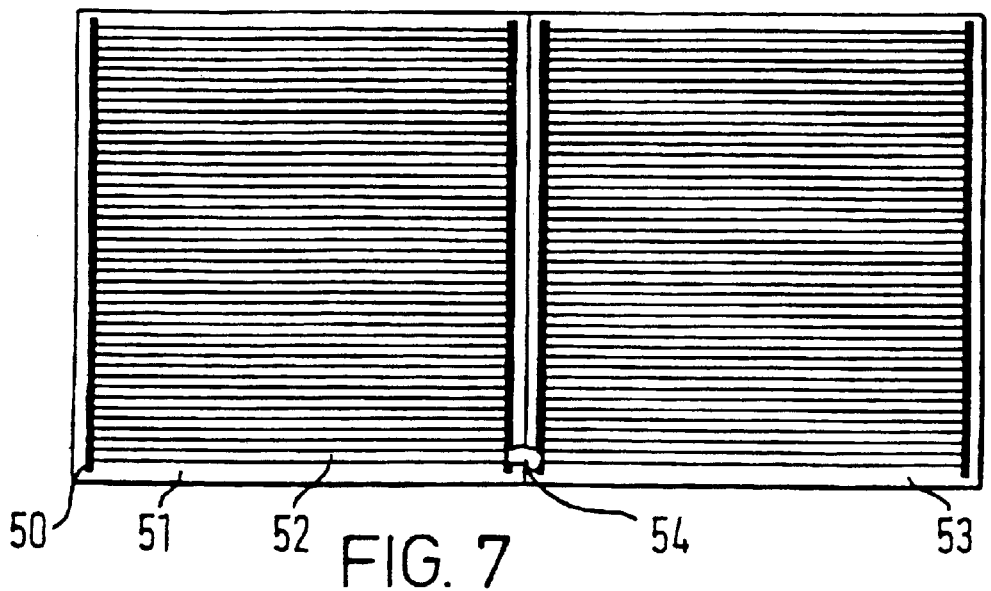
FIG. 7 is a schematic representation showing the juxtaposition of two detectors as described with reference to FIG. 5.

At the upper surface of the depletion layer 39, a pattern of N$^+$strips 38 is provided in order to achieve good electrical contact to the read-out circuitry in order to provide good reliability, while at the same time minimizing the thickness of the entrance window which is formed by the field oxide layer 37 and MYLAR™ film 32. A bias is provided on the N$^+$strips 38 through a common bus line (not shown in FIG. 5). As shown in FIG. 7, several detectors of this type can be connected together to form a larger detection area without any wire bonds on the entrance surface of the detector. The composite detector can thus have a flat entrance surface with a smooth contact with the beta-ray active sample.

The MYLAR™ layer on the contact surface of the semiconductor substrate should be kept as thin as possible in order to allow the radiation reach the depletion layer of the detectors described above. How thin the layer needs to be is dependent upon the energy of the radiation it is intended to detect. Preferably the MYLAR™ layer is in the form of a film having a thickness of 10 $\mu$m of less, more preferably 5 $\mu$m or less, and yet more preferably 2 $\mu$m or less. As the MYLAR™ film forms substantially the thickness of the radiation entrance window, the radiation entrance window to a cell would thus have a thickness of 10 $\mu$m of less, preferably 5 $\mu$m or less, and more preferably 2 $\mu$m or less.

Figure 6:
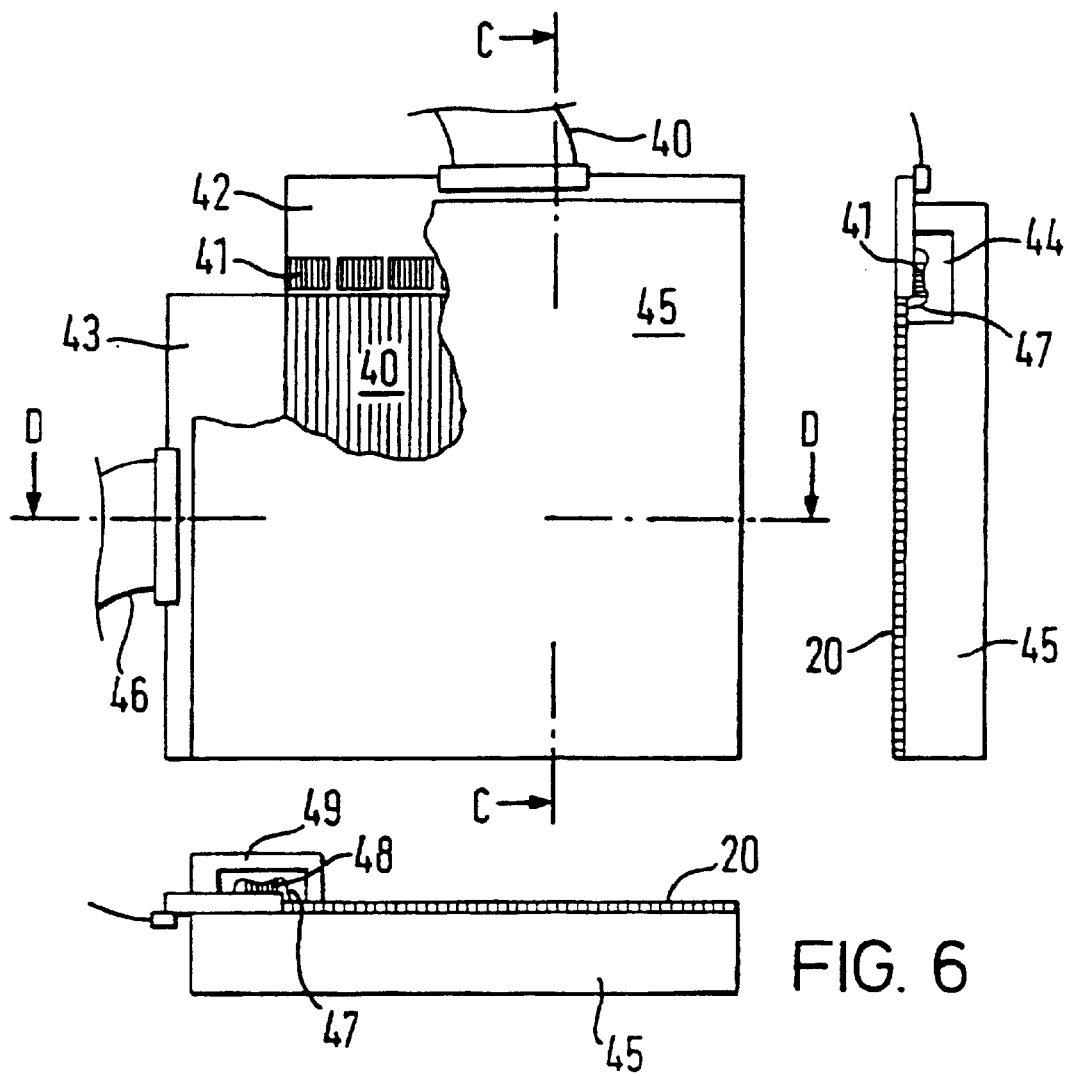
FIG. 6 is a schematic representation of part of the imaging system of FIG. 1.

FIG. 6 illustrates bottom and cross-sectional schematic views of a double-sided strip detector module for the radiation detector system 10 of FIG. 1. The detector module includes a strip detector 20 as illustrated schematically in FIGS. 2–4 mounted onto hybrid boards 42 and 43. The detector strips are wire bonded 47 to readout chips 41 and 48. Cables 40 and 46 provide connection to control and data acquisition electronics (not shown in FIG. 6). The detector module is supported by means of a structure 45 which is glued or otherwise attached on the side (that is the lower surface as shown in FIGS. 2–4) opposite to that on which the sample is to be placed. As shown in a schematic cross-section on line C—C, readout chips 41 for the strips 29 (see FIG. 4) at the lower side of the detector 20 are provided in a recess 44 in the supporting structure 45. As shown in a cross-section along lines D—D a cover structure 49 provides protection for the readout chips 48 and associated wire bonds to the strips 25 (see FIG. 3) on the entrance (upper) side of the detector 20. The readout chips 41 and 48 provide energy resolution based on charge accumulated for each and every impinging beta-ray. Typical beta-ray energy used for labelling, or marking, vary from 5 keV to about 1700 keV. Charge and consequently energy resolution which can be achieved with commercially available charge amplifiers is of the order of 5%. Preferably, readout chips 48 are operated in a self-triggering mode, where for each signal detected, which is above the minimum threshold, the value of the charge is then recorded.

Single detector modules made of silicon can have an active imaging surface of up to 10 cm by 10 cm. If larger areas are needed, this is possible by combining together individual silicon modules, for example as shown in FIG. 7. FIG. 7 shows the reverse (lower) side of two single-sided strip detectors 51 and 53 connected together to form a larger detection area. The N$^+$implantation 52 is patterned in a strip-like configuration to minimise the thickness of the entrance window as described above. The front side bias is provided through bus-lines 50. Electrical contact between the detectors 51 and 53 is provided by conventional wire bonding or a thin layer of conductive glue or conductive polymers 54.

Figure 8:
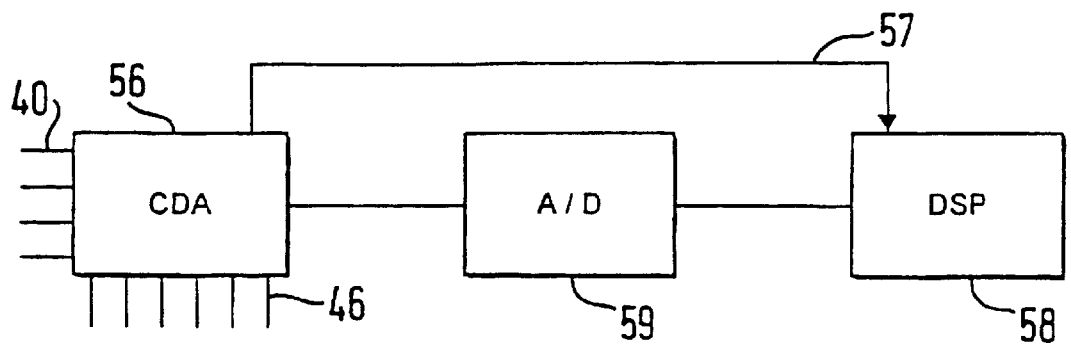
FIG. 8 is a schematic representation of the processing of detected image signals.

FIG. 8 is a schematic representation of the processing performed by the apparatus as described above. In particular, control and data acquisition electronics 56 are connected via the cables 40 and 46 to the self-triggering readout chips 41 and 48. The readout chips 41 and 48 include charge amplifiers, for example operable at 100 kHz providing 100,000 samples per second. Typical counting rates encountered in autoradiography extend from 0.01 counts/ (min.mm$^2$) to 1000 counts/(min.mm$^2$), so that 100 kHz is normally sufficient. The charge amplifiers can be arranged to signal an incident beta-ray for charge values detected which are representative of an energy above a predetermined threshold, for example for energies in excess of 1 keV, or another preferred value, of, 4 keV. When the readout chips 48 detect a charge value greater than a predetermined threshold and supply this charge value to the control and data acquisition electronics 56, the latter responds to this by supplying address information 57 to a digital signal processor 58, which can be implemented by means of the personal computer as described above, for providing imaging processing. The analogue charge value is also supplied to an analogue to digital converter 59 which converts the charge value into a digital number for processing by the digital signal processor 58.

Figure 9:
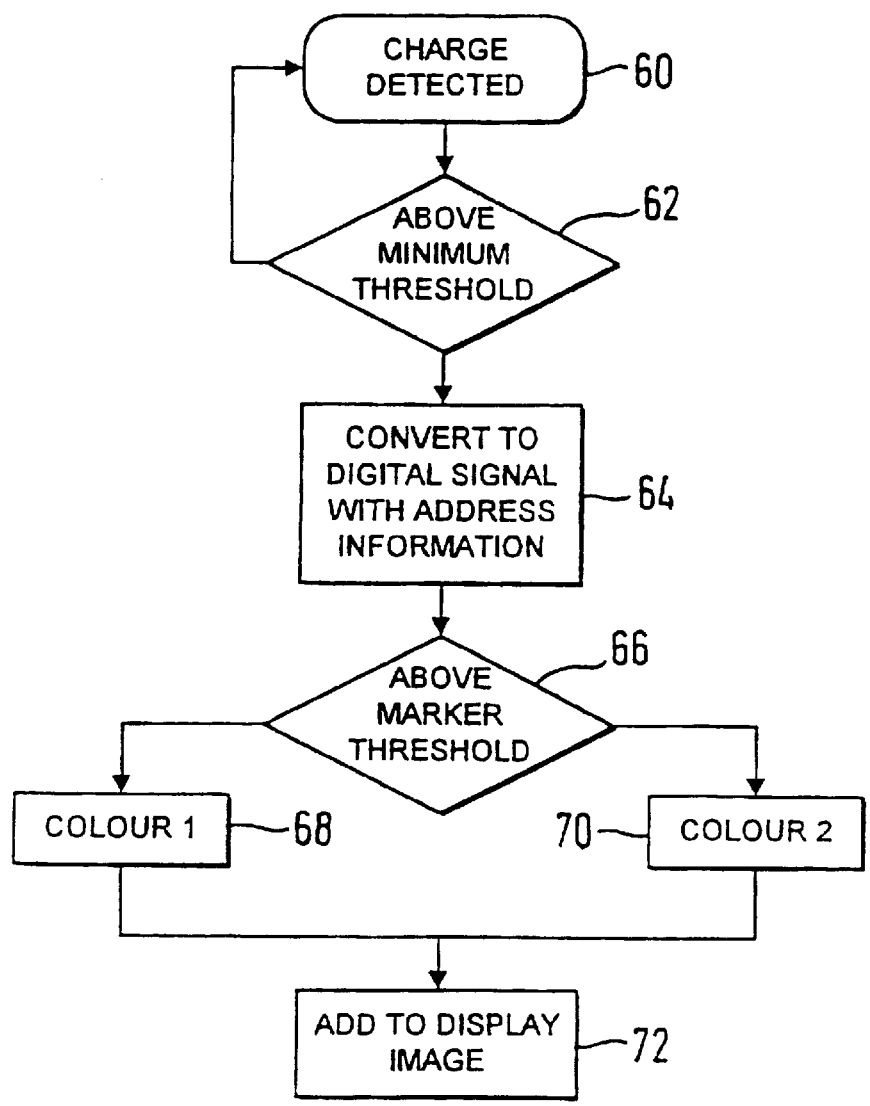
FIG. 9 is a flow diagram illustrating the processing of detected image signals.

FIG. 9 is a flow diagram illustrating the processing of an incident beta-ray hit.

At 60, if a charge is registered representative of a radiation hit in excess of a predetermined energy (for example 1 keV or 4 keV), then the analogue charge value is supplied via the electronics 56 to the analogue to digital converter 59 and the address indicating the position on the detector at which the radiation was detected is supplied to the digital signal processor 58. The digital value received from the analogue to digital converter 59 is stored 64 in the digital signal processor 58 in an appropriate location in a pixel map. If the detected charge value is above the selected marker threshold 66 then a first colour value 68 is allocated to the pixel position, otherwise a second colour value 70 is allocated to the pixel position. The resulting image can be displayed 72 in real time as the image is collected in the display 14. The pixel map for controlling the display 14 can be stored in the digital signal processor in conventional memory. The pixel map can be arranged to accumulate intensity values for each marker type for each pixel. In other words, for each marker type which is being recorded for each pixel on the display, the number of hits for that marker type is recorded, thus providing the intensity of the specific marker type for each pixel on the display.

As well as discriminating between energy ranges, the digital signal processor can be arranged to count radiation hits within respective ranges and to allocate intensity values to each colour value, thereby permitting a display of the number and energy of the radiation hits. The digital signal processor is arranged to update the displayed image at user selectable or predetermined intervals.

Using the apparatus as described above, therefore, it is possible to use two separate markers for a sample to form the subject of autoradiography. For example, for toxicological and pharmacokinetic investigations using samples of human or animal tissue, drugs can be labelled with two different markers which emit different beta-ray radiation characteristics. Then, when the tissue sample is attached to the surface of the detector, the respect distributions of the markers in the sample can be measured at the same time to give a direct comparison of the distribution of the radioactive markers through the sample. That is, the detector detects radiation from both markers, but, through the use of the marker threshold at 66 in the process described in FIG. 9, different colours are allocated the charge values recorded depending on whether those charge values are above or below the threshold in question. The "colours" can be distinct colours, or alternatively can be grey-scales of a particular colour. Accordingly, it will be appreciated that it is desirable that the markers chosen have different radiation emission distribution characteristics (spectra) so that the use of a threshold will be able readily to discriminate emissions from the first and from the second marker. In practice, there will be some overlap between the emissions from the two markers, as the beta-ray emission characteristics are spread over a range rather than being restricted to a single energy value.

The same basic approach can be used, for example, for autoradiography analysis of "blots". Thus, by applying two different RNA/DNA probes with different radioactive markers, a direct, immediate, and real time comparison under identical conditions can be achieved of the resulting blots. In other words, the blot will include different bands for each of the two markers so that the marker thresholding described above can be used to discriminate the bands resulting from each of the markers. It will be appreciated that, by the use of markers having different radiation emission distribution characteristics (spectra), concurrent examination using different probes can be achieved under identical conditions, thereby increasing accuracy and reproducibility of the autoradiography testing procedure.

Thus, there has been described a new technique for performing multiple label or marker imaging in autoradiography based on an energy discriminating imaging technique. Impinging beta-rays originating from different isotopes within the same sample are registered/coloured according to their energy. With currently available charge amplifiers offering a resolution in energy of the order of 5% or better, a high level of discrimination is possible. In the preferred embodiments, a strip semiconductor detector (double or single-sided) can be used. The inactive depth in the semiconductor entrance phase is typically of a few microns and since a sample can be brought and pressed into contact with the semiconductor, the efficiency is extremely high compared with any other method used today for beta-ray imaging and autoradiography. For 14 C., an efficiency of greater than 70% with a position resolution of better than 50 $\mu$m can be achieved. Large imaging areas can be constructed by combining single semiconductor strip detector modules in the manner described with reference to FIG. 7, or in other ways (e.g. tiling). As mentioned above, the imaging can be performed in real time with user defined image display updates.

Although particular embodiments of the inveniton have been described, it will be appreciated that many modifications and/or additions may be made within the scope of the invention.

For example, although silicon has been described as the preferred semiconductor, other options may include cadmium telluride (CdTe), cadmium zinc telluride (CdZnTe), mercury iodide (Hgl), lead iodide (Pbl), and so on.

Although strip detectors have been described, other detector configurations, for example based on individually addressable pixel cells, could be used.

Also, although in the preferred embodiments a personal computer has been employed for implementing the digital signal processor, it will be appreciated that some of all of the functions performed in the present invention may be implemented by means of special purpose hardware, using, for example, ASIC, or like technology.

Moreover, although the use of two markers having respective energy distributions is described, the invention includes the use of three or more markers and discrimination of three or more energy ranges with respect to appropriate thresholds to provide multiple label radiography imaging.

What is claimed is:

1. A method of autoradiography imaging comprising:
   (a) forming a marked subject having first and second markers, wherein each marker provides radiation having characteristics energy distribution;
   (b) detecting radiation from said marked subject using a semiconductor radiation detector having an array of cells, each cell of which records a charge value dependent on the energy of radiation incident thereon;
   (c) processing an output from said cells, including discriminating charge values within at least two charge value ranges and allocating a display color value to each cell position in said array dependent upon the recorded charge value; and
   (d) forming an image for display with individual cell positions having a color representative of said display color values.

2. The method of claim 1, wherein the display color values comprise respective grey scale values for a predetermined color.

3. The method of claim 1, wherein each color is a respective, distinct color.

4. The method of claim 1, wherein said markers comprise radioactive markers.

5. The method of claim 1, wherein said markers comprise radioactive isotopes selected from a group consisting of 3H, 35S, 32P, 33P, 14C and 125I.

6. The method of claim 1, wherein said markers emit high energy radiation having an energy in excess of 1 keV.

7. The method of claim 1, wherein each of said markers emits beta-rays and provides a different energy distribution.

8. The method of claim 1, wherein said step of forming a marked subject comprises using first and second probes to form a marked subject in a form selected from a group consisting of a DNA blot, an RNA blot, a protein blot or a carbohydrate blot, wherein each of said first and second probes has a different radioactive marker.

9. The method of claim 1, further comprising marking a tissue sample with at least two markers.

10. The method of claim 1, wherein said step of detecting radiation from said marked subject comprises using a semiconductor radiation detector having a one-dimensional array of strip cells.

11. The method of claim 1, wherein said step of detecting radiation from said marked subject comprises using a semiconductor radiation detector having first and second one-dimensional arrays of strips arranged orthogonally to one another to define a two-dimensional array of cells.

12. The method of claim 1, wherein said step of detecting radiation from said marked subject comprises using a semiconductor radiation detector having a two-dimension array of pixel cells.

13. The method of claim 1, further comprising placing said marked subject in contact with said semiconductor radiation detector.

14. The method of claim 1, further comprising updating said image for display at user selectable intervals.

15. The method of claim 1, further comprising updating said image for display at predetermined intervals.

16. An autoradiography apparatus comprising:
a semiconductor radiation detector having an array of cells for recording a charge value dependent on the energy of radiation incident thereon from a marked subject having first and second markers, wherein each of said cells includes an output; and
a processing circuitry coupled to the outputs of said cells, wherein said processing circuitry is arranged to discriminate charge values within at least two charge value ranges and to allocate a display color value to each cell position in said array dependent upon the recorded charge value for forming an image for display with individual cell positions having a color representative of said color values.

17. The autoradiography apparatus of claim 16, wherein said color values comprise respective grey scale values for a predetermined color.

18. The autoradiography apparatus of claim 16, wherein each color is a respective, distinct color.

19. The autoradiography apparatus of claim 16, wherein said markers comprise radioactive markers.

20. The autoradiography apparatus of claim 16, wherein said markers comprise radioactive markers selected from a group consisting of 3H, 35S, 32P, 33P, 14C and 125I.

21. The autoradiography apparatus of claim 16, wherein said markers emit high energy radiation having an energy in excess of 1 keV.

22. The autoradiography apparatus of claim 16, wherein each of said markers emits beta-rays and provides a different characteristic energy distribution.

23. The autoradiography apparatus of claim 16, wherein said marked subject is of a type selected from a group consisting of a DNA blot, an RNA blot, a protein blot or a carbohydrate blot, and is formed by using first and second probes, each of which has a different radioactive marker.

24. The autoradiography apparatus of claim 16, wherein said marked subject comprises a tissue sample with at least two markers.

25. The autoradiography apparatus of claim 16, wherein said semiconductor radiation detector has a one-dimensional array of strip cells.

26. The autoradiography apparatus of claim 16, wherein said semiconductor radiation detector has first and second one-dimensional arrays of strips arranged orthogonally to one another to define a two-dimensional array of cells.

27. The autoradiography apparatus of claim 16, wherein said semiconductor radiation detector has a two-dimensional array of array of pixel cells.

28. The autoradiography apparatus of claim 16, wherein said semiconductor radiation detector includes a protective layer to avoid contamination of a semiconductor substrate of said detector when said marked subject is placed in contact with said semiconductor radiation detector.

29. The autoradiography apparatus of claim 16, wherein said semiconductor radiation detector provides a radiation entrance window for one of said cells having a thickness of less than or equal to approximately 10 $\mu$m.

30. The autoradiography apparatus of claim 16, wherein said semiconductor radiation detector provides a radiation entrance window for one of said cells having a thickness of less than or equal to approximately 5 $\mu$m.

31. The autoradiography apparatus of claim 16, wherein said semiconductor radiation detector provides a radiation entrance window for one of said cells having a thickness of less than or equal to approximately 2 $\mu$m.

32. The autoradiography apparatus of claim 16, further comprising a charge amplifier configured to output analog signals representative of said recorded charge values, an analog to digital converter coupled to said charge amplifier, and a digital processing circuitry coupled to said analog to digital converter, said digital processing circuitry being configured to discriminate digital values within respective ranges defined by one or more thresholds and to allocate color values accordingly.

33. The autoradiography apparatus of claim 32, wherein said digital processing circuitry is further configured to accumulate radiation hits within respective ranges and to allocate intensity values to each of said color values.

34. The autoradiography apparatus of claim 32, wherein said image for display is updated at user selectable intervals.

35. The autoradiography apparatus of claim 32, wherein said image for display is updated at predetermined intervals.

36. The autoradiography apparatus of claim 16, further comprising a display coupled to said processor.

* * * * *